United States Patent [19]

Borchardt

[11] Patent Number: 4,932,473
[45] Date of Patent: Jun. 12, 1990

[54] ENHANCING THE SALT TOLERANCE OF AQUEOUS SULFONATE SURFACTANT SOLUTIONS

[75] Inventor: John E. Borchardt, Houston, Tex.

[73] Assignee: Shell Oil Company, Houston, Tex.

[21] Appl. No.: 291,718

[22] Filed: Dec. 29, 1988

[51] Int. Cl.$^5$ .............................................. E21B 43/22
[52] U.S. Cl. ................. 166/275; 166/305.1; 252/8.554
[58] Field of Search ................. 166/273–275, 166/246, 305.1; 252/8.554; 536/4.1

[56] References Cited

U.S. PATENT DOCUMENTS

| | | | |
|---|---|---|---|
| 3,885,626 | 5/1975 | Gale et al. | 166/273 |
| 4,286,660 | 9/1981 | Wagner et al. | 166/246 |
| 4,522,261 | 6/1985 | McInerney et al. | 166/246 |
| 4,528,106 | 7/1985 | Grolitzer | 166/275 X |
| 4,608,204 | 8/1986 | Lew et al. | 252/8.554 X |
| 4,609,478 | 9/1986 | Egan | 252/8.554 |
| 4,765,408 | 8/1988 | Morita et al. | 166/273 X |
| 4,773,484 | 9/1988 | Chang et al. | 166/273 X |

FOREIGN PATENT DOCUMENTS

| | | | |
|---|---|---|---|
| 2646505 | 4/1978 | Fed. Rep. of Germany | 166/275 |
| 2646506 | 4/1978 | Fed. Rep. of Germany | 166/275 |
| 2646507 | 4/1978 | Fed. Rep. of Germany | 166/275 |

OTHER PUBLICATIONS

D. J. Miller, "Precipitation of Anionic Surfactants by Calcium Ions", Proceedings: 2nd World Surfactants Congress, Paris, May 24–27, 1988, pp. 399–410.

*Primary Examiner*—George A. Suchfield

[57] ABSTRACT

In a process in which one or more alkyltoluene sulfonate surfactants are applied in solution in a saline aqueous liquid for purposes of enhanced oil recovery, the invention is the improvement which comprises incorporating into the said solution one or more alkylpolysaccharide surfactant in a quantity which is effective for enhancing the solubility of the alkyltoluene sulfonate surfactants in the aqueous solution. The invention is particularly effective for enhancing both the calcium and sodium salt tolerance of aqueous solutions of alkyl toluene sulfonate surfactants.

15 Claims, No Drawings

ENHANCING THE SALT TOLERANCE OF AQUEOUS SULFONATE SURFACTANT SOLUTIONS

This invention relates to an improved process for the surfactant-aided recovery of oil from a subterranean oil-bearing formation wherein an aqueous alkyltoluene surfactant solution is applied to promote the displacement of the oil. The invention particularly relates to enhancing the salt tolerance of the alkyltoluene sulfonate surfactants in oil recovery solutions.

BACKGROUND OF THE INVENTION

It is well known that many sulfonate surfactants are useful in oil recovery processes, and that in such processes the surfactants are exposed to saline environments, particularly to concentrations of sodium and calcium salts. For example, aqueous surfactant solutions which are injected into subterranean oil-containing reservoirs often encounter deposits of high salinity brines. Furthermore, it is known that aqueous surfactant solutions undergo ion exchange with metal ions from reservoir clays. Still further, it is often desirable to use saline solutions, such as seawater or brines which have been recovered from the reservoir in conjunction with the oil, as sources of water for surfactant solutions injected into the reservoir for oil recovery purposes.

It is also recognized, however, that aqueous solutions of these as well as many other surfactants exhibit limited tolerance for dissolved salts, that is, the solubility of the surfactants in the solutions is significantly reduced as the concentration of salts in the solutions is increased. As a result, both the efficiency of the surfactants in oil recovery processes and the rate at which oil is recovered are reduced. Thus, in the case of processes which depend on the interfacial tension properties of the surfactant for direct mobilization of the oil, limited solubility of a surfactant means that it will move into and through the reservoir at a slower rate. Less surfactant will be available at a given location in the reservoir at a given point in time to mobilize the oil. In addition, limited surfactant solubility could convert a low interfacial tension middle-phase microemulsion to a higher interfacial tension upper-phase microemulsion which mobilizes less oil. In the case of processes which rely on mixtures of aqueous surfactant solutions with steam or other gases to generate "foams" which channel the oil recovery drive fluids to oil-rich areas of the reservoir, lower concentration of surfactant in the solutions results in a slower and less effective propagation of the foam front through the reservoir. After surfactant injection, the operator will encounter a longer delay in the onset of increased oil production.

In these and other cases, salt tolerance limitations may result in an effective loss of surfactant, an increase in process expense, and a decrease in oil recovery. For instance, a surfactant of limited salt tolerance may precipitate from solution as it encounters high salinity deposits in the reservoir. Quantities of surfactant above the limit of solubility fail to contribute to the oil recovery process.

It is the principal object of the present invention to increase the salt tolerance of sulfonate surfactants in aqueous solutions.

SUMMARY OF THE INVENTION

It has now been found that the solubility of alkyltoluene sulfonate surfactants in a saline aqueous liquid can be substantially enhanced by incorporating into the aqueous solution one or more polysaccharide surfactants of the formula $RO(R^1O)_xS_z$, wherein R is a monovalent organic radical having a carbon number in the range from about 7 24, $R^1$ represents a divalent hydrocarbon radical containing from about 2 to about 4 carbon atoms, x is a number having an average value in the range from 0 to about 12, and $S_z$ represents an average number z of moieties derived from reducing saccharides containing 5 or 6 carbon atoms. R preferably represents an alkyl, alkylphenyl, hydroxyalkyl phenyl, or hydroxyalkyl moiety having a carbon number in the range from about 8 to 20, the optional ($R^1O$) group is (when present) preferably an oxyethylene group, x is preferably between about 0 and 8 and is most preferably O, S preferably represents a glucose, galactose, glucosyl or galactosyl residue and more preferably represents a glucose residue, and z is suitably between about 0.7 and 10.0 and is most preferably between about 1.3 and 4.0.

Polysaccharides are found to increase the salt tolerance of the alkyltoluene sulfonate surfactants, particularly their tolerance for calcium and sodium ions in aqueous media. As a result, the alkyltoluene surfactants find greater acceptance, for example, in processes for oil recovery from moderate to high salinity reservoirs and in processes where seawater or another brine solution serves as the source of water for aqueous surfactant solutions.

Accordingly, the present invention particularly provides a surfactant-aided process for the recovery of oil from a subterranean oil-bearing formation, wherein an aqueous saline solution of one or more alkyltoluene sulfonate surfactants is applied to promote the displacement of oil from the formation, and particularly provides an improvement in such an oil recovery process which comprises incorporating into the aqueous surfactant solution a quantity of one or more polysaccharide surfactants which is effective for enhancing the solubility therein of the alkyltoluene sulfonate surfactants under the saline conditions.

DESCRIPTION OF THE PREFERRED EMBODIMENTS

The invention is suitably applied in any process where it is desired to improve the salt tolerance of an aqueous solution of an alkyltoluene sulfonate surfactant, but is particularly intended for application in processes which utilize such aqueous solutions to aid in the recovery of oil from subterranean oil-containing reservoirs.

Investigations of the influence of polysaccharide surfactants upon the salt tolerance of other sulfonate solutions have established the criticality of the application of this invention to only alkyltoluene sulfonate surfactants. Although the polysaccharides may have a positive affect upon solutions of other sulfonates, they have not been found to offer the same consistency or degree of salt tolerance improvement.

Suitable alkyltoluene sulfonate surfactants particularly include those wherein the alkyl group has a higher carbon number, i.e., a carbon number in the range from 6 to about 28. The carbon chain of the alkyl group is suitably of either linear or branched structure, although surfactants wherein the alkyl substituent is predominantly linear are particularly preferred. More preferred are surfactants wherein the alkyl group is linear in at least about 75%, most preferably at least about 90% of the alkyltoluene sulfonate molecules. Preference can also be stated for surfactants wherein the alkyl groups are predominantly in the $C_{10}$ to $C_{24}$ range, inclusive, while surfactants wherein the alkyl groups are predominantly in the $C_{18}$ to $C_{24}$ range, inclusive, are considered most preferred. In general, such preferences reflect not only factors which pertain to the performance of this invention but also to aspects of the demand for use of such surfactants for enhanced oil recovery.

For purposes of the invention, one or more of the polysaccharides are incorporated into an aqueous solution of the alkyltoluene sulfonate surfactant, for the purpose of enhancing its solubility in the presence of salts which are or may be present in that solution. Calcium and/or sodium salts may, in this respect, be present in the solution as it is formulated as a result of the use of a source of water such as seawater or reservoir brine. Alternatively, the polysaccharides may be introduced into an aqueous sulfonate solution which at the time it is formulated contains little or no salts, but which will encounter soluble salts when it is injected into a subterranean reservoir in connection with an oil recovery operation.

Polysaccharides suitable for use in this invention can be one or a mixture of compounds represented by the formula $RO(R^1O)_xS_z$. The hydrophobic R substituent in this formula represents a monovalent organic radical having a carbon number in the range from about 7 to 24. Preferred for use in the practice of the invention are polysaccharides wherein the hydrophobic R group of the molecule is an alkyl, alkylphenyl, hydroxyalkylphenyl, or hydroxyalkyl group. Preference can also be expressed for R substituents having carbon numbers in the range from about 8 to 20, while an R group in the $C_9$ to $C_{15}$ range is more preferred and an R group in the $C_9$ to $C_{11}$ range is considered most preferred. In the case of hydroxyalkyl and hydroxyalkylphenyl groups, R may contain up to about 3 hydroxy groups. The R group may have a branched-chain structure, but is preferably of linear carbon chain structure. It is often the case that commercially prepared polysaccharide products are comprised of mixtures of molecules characterized by R groups within a range of carbon numbers and having different structures. Such mixtures are very suitable for purposes of this invention.

The $R^1$ divalent hydrocarbon radical suitably has a carbon number in the range of from about 2 to 4. Preferably, each ($R^1O$) unit represents an oxyethylene or oxypropylene radical, and is most preferably an oxyethylene radical. The $(R^1O)_x$ moiety is an optional substituent of the surfactant molecule which may be present as a link between the hydrophobic R moiety and the hydrophylic polysaccharide moiety. The number x of oxyalkylene substituents, which commonly represents the average of a range of individual integer values, is suitably between about 0 and 12.0, and is preferably 0. When x is not 0, it is preferably between about 2.5 and 8.0, and more preferably between about 2.5 and 5.0.

The polysaccharides are typically prepared as mixtures of molecules having different numbers of added hydrophilic saccharide units, i.e., different values of z in the above formula. For this reason, the number of saccharide units in the product molecules is best expressed as an average value. Preference can be stated for use in this invention of polysaccharides having an average number of saccharide units in the range from about 0.7 to 10.0, while an average number of saccharide units per molecule which is in the range from about 1.0 to 6.0 is considered more preferred and an average number of saccharide units per molecule which is in the range from about 1.2 to 4.0 is considered most preferred.

The saccharide unit S is derived from a reducing saccharide containing 5 or 6 carbon atoms. For example, each S may be a glucoside, galactoside, fructoside, glucosyl, galactosyl, or fructosyl group. Preferably, S is a glucose, galactose, glucosyl, galactosyl residue; more preferably S represents a glucose residue.

Polysaccharide surfactants useful in this invention also include those in which one or more of the normally free (i.e., unreacted) hydroxyl groups of a saccharide moiety S have been alkoxylated, resulting in one or more pendant alkoxy or polyalkoxy groups in place of the hydroxyl group(s). Preferably, the added alkoxy or polyalkoxy groups are oxyethylene or oxypropylene groups, or mixed oxyethylene/oxypropylene groups. The surfactant may suitably contain an average of from 0 to about 20 mols (preferably 0 to 10 mols) of such pendant oxyalkylene units per mole of saccharide moiety S (i.e., per unit value of z).

Such polysaccharides are conventional surfactant materials, which can be prepared by methods well known in the art.

The polysaccharides are typically applied in an amount up to that corresponding to the concentration by weight of the alkyltoluene sulfonate in the aqueous solution. In most cases, it is anticipated that a lesser amount by weight of the polysaccharide, relative to the weight of the alkyltoluene sulfonate, will provide a most efficient and economical performance, particularly, an amount of polysaccharide which corresponds to a weight ratio of alkyltoluene sulfonate to polysaccharide which is in the range from about 2:1 to about 10:1. Taking into account the concentration at which the alkyltoluene sulfonates are typically applied in oil recovery solutions, the polysaccharides are preferably introduced in sufficient amount to provide a concentration in the aqueous solution which is in the range from about 0.05 to 5%w (percent by weight), while a concentration in the range from about 0.1 to 0.5% is considered particularly preferred.

The process of the invention is useful over a wide range of operating conditions. For instance, the polysaccharides are effective for purposes of the invention over a wide range of temperature and pressure, including conditions associated with the injection of aqueous phases associated with high-pressure/high-temperature (e.g., up to about 500° F.) steam injections.

The invention is further described with reference to the following Examples (illustrative of the invention) and Comparative Experiments (not in accordance with the invention) which are provided to demonstrate certain preferred embodiments. These examples are not intended to restrict the broader scope of the invention.

For purposes of these examples and comparative experiments, a salt tolerance titration method was developed to quantify the salt tolerance of aqueous sulfonate surfactant solutions. A dipping probe colorimeter was used to measured the light transmittance of a surfactant solution. Light transmittance was monitored while a salt solution was gradually added to a solution of alkyltoluene sulfonate or other sulfonate surfactant. A sharp drop in light transmittance was indicative of reaching a salt concentration in the sulfonate surfactant solution which corresponded to the inception of precipitation of the surfactant from the solution—the higher the salt concentration before the precipitation of surfactant commenced, the greater the salt tolerance of the surfactant in that solution.

The dipping probe colorimeter (Brinkman Instruments, Inc. model PC-800) has an incident light source frequency of 650 nanometers. The transmittance scale of the unit was adjusted so that deionized water gave a transmittance of 90%. For each test, 100 cc of a sulfonate surfactant solution was placed in the colorimeter's sample holder and allowed to equilibrate to a temperature of 75° C. In the examples of the invention, a predetermined quantity of polysaccharide was also incorporated into the alkyltoluene surfactant solution. Two different polysaccharides (designated I and II) were utilized:

polysaccharide I, an alkylpolyglycoside of the above formula, wherein R represents a mixture of essentially linear $C_9$ to $C_{11}$ alkyl groups, x is zero, S represens a glucosyl group and z averages 2.3; and polysaccharide II, an alkylpolyglycoside of the above formula, wherein R represents a mixture of essentially linear $C_{12}$ to $C_{13}$ alkyl groups, x is zero, S represents a glucosyl group and z averages 1.7.

Test solutions in the sample holder were stirred at about 3500 rpm. Initial transmittance of the sulfonate surfactant solution (in the absence of added salt) was typically greater than 85%. A salt solution was added to the test solution via syringe. Highly concentrated salt solutions (i.e., 24% or 40% solutions of calcium chloride, and a 24% sollution of sodium chloride) were used to minimize volume changes in the surfactant solution. Light transmittance was continually monitored during addition of salt solution.

COMPARATIVE EXPERIMENT A, AND EXAMPLES 1-3

These Examples and Comparative Experiment demonstrate the benefits of this invention in enhancing the calcium ion tolerance of alkyltoluene sulfonate surfactants. In each case, the surfactant was characterized by a $C_{18}$ alkyl groups, essentially all of linear carbon chain structure, and had been prepared by alkylation of toluene with 1-octadecene, followed by sulfonation of the alkyltoluene (in this case, by reaction with a solution of sulfur trioxide in anhydrous sulfuric acid). This surfactant is commercially available as ENORDET LTS 18 (ENORDET is a registered trademark of Shell Chemical Company).

Comparative Experiment A illustrates the calcium salt tolerance of a 75° C. solution of this $C_{18}$ linear alkyltoluene sulfonate. Calcium ion tolerance of a 0.5%w solution of the surfactant was measured using the salt tolerance titration method. A 26.5%w calcium chloride solution was added in 25 microliter aliquots to 100 cc of the surfactant solution with vigorous stirring. In the absence of polysaccharide, the addition of about 135 ppm of calcium ions, based on surfactant solution, reduced light transmittance to one half of its initial level. The complete results of Comparative Experiment A are presented in Table A.

TABLE A

| Added $Ca^{+2}$ concentration, ppm | Added Polysaccharide | Added Polysaccharide concentration, % w | Transmittance % of initial value |
| --- | --- | --- | --- |
| 0 | none | 0 | 100.0 |

TABLE A-continued

| Added $Ca^{+2}$ concentration, ppm | Added Polysaccharide | Added Polysaccharide concentration, % w | Transmittance % of initial value |
| --- | --- | --- | --- |
| 24 | none | 0 | 96.4 |
| 48 | none | 0 | 89.3 |
| 72 | none | 0 | 80.4 |
| 96 | none | 0 | 65.1 |
| 119 | none | 0 | 56.1 |
| 143 | none | 0 | 44.2 |
| 167 | none | 0 | 6.5 |
| 191 | none | 0 | 1.8 |

For Example 1, the test procedures of Comparative Experiment A were repeated, although in this case the surfactant solution contained (in addition to the 0.5%w $C_{18}$ linear alkyltoluene sulfonate) 0.10%w of the alkylpolyglycoside designated I. The presence of the alkylpolyglycoside meaningfully increased the calcium salt tolerance of the sulfonate surfactant solution—light transmittance was reduced to one half of its initial level only after addition of approximately 190 ppm calcium. Results of Example 1 are presented in Table 1.

TABLE 1

| Added $Ca^{+2}$ concentration, ppm | Added Polysaccharide | Added Polysaccharide concentration, % w | Transmittance % of initial value |
| --- | --- | --- | --- |
| 0 | I | 0.10 | 100.0 |
| 24 | I | 0.10 | 98.1 |
| 48 | I | 0.10 | 92.6 |
| 72 | I | 0.10 | 85.5 |
| 96 | I | 0.10 | 79.1 |
| 120 | I | 0.10 | 76.2 |
| 144 | I | 0.10 | 74.2 |
| 167 | I | 0.10 | 69.7 |
| 191 | I | 0.10 | 49.8 |
| 215 | I | 0.10 | 6.8 |
| 239 | I | 0.10 | 0.7 |

For Example 2, the calcium salt tolerance test was applied to a solution containing 0.5%w linear alkyltoluene sulfonate and 0.25%w of the same alkylpolyglycoside used in Example 1. Reduction of light transmittance to half the initial level was observed only after addition of about 375 ppm calcium. Results of Example 2 are presented in Table 2.

TABLE 2

| Added $Ca^{+2}$ concentration, ppm | Added Polysaccharide | Added Polysaccharide concentration, % w | Transmittance % of initial value |
| --- | --- | --- | --- |
| 0 | I | 0.25 | 100.0 |
| 48 | I | 0.25 | 95.0 |
| 72 | I | 0.25 | 89.2 |
| 239 | I | 0.25 | 81.3 |
| 358 | I | 0.25 | 69.0 |
| 381 | I | 0.25 | 38.9 |
| 476 | I | 0.25 | 6.2 |
| 594 | I | 0.25 | 1.9 |

For Example 3, the procedures of Example 2 were again followed, although in this case 0.25%w of a polysaccharide II was incorporated into the alkyltoluene sulfonate sample solution. This alkylpolyglycoside was equally effective for reducing the calcium salt tolerance of the alkyltoluene sulfonate, with reduction in light transmittance to half the initial value observed only after addition of about 400 ppm calcium. Results of Example 3 are presented in Table 3.

TABLE 3

| Added $Ca^{+2}$ concentration, ppm | Added Poly-saccharide | Added Poly-saccharide concentration, % w | Transmittance % of initial value |
|---|---|---|---|
| 0 | II | 0.25 | 100.0 |
| 24 | II | 0.25 | 96.8 |
| 48 | II | 0.25 | 91.8 |
| 72 | II | 0.25 | 86.0 |
| 96 | II | 0.25 | 80.7 |
| 120 | II | 0.25 | 79.2 |
| 167 | II | 0.25 | 78.5 |
| 191 | II | 0.25 | 77.7 |
| 215 | II | 0.25 | 76.7 |
| 239 | II | 0.25 | 75.5 |
| 263 | II | 0.25 | 73.9 |
| 287 | II | 0.25 | 71.8 |
| 311 | II | 0.25 | 70.5 |
| 335 | II | 0.25 | 69.7 |
| 359 | II | 0.25 | 68.1 |
| 383 | II | 0.25 | 60.3 |
| 407 | II | 0.25 | 37.0 |
| 431 | II | 0.25 | 18.0 |
| 454 | II | 0.25 | 9.3 |
| 478 | II | 0.25 | 6.1 |
| 502 | II | 0.25 | 4.6 |
| 550 | II | 0.25 | 3.3 |
| 622 | II | 0.25 | 2.2 |

COMPARATIVE EXPERIMENT B, AND EXAMPLES 4-6

These Examples and Comparative Experiment demonstrate the benefits of this invention in enhancing the sodium ion tolerance of the same alkyltoluene sulfonate surfactant solution tested in Comparative Experiment A and Examples 1-3.

Comparative Experiment B illustrates the sodium salt tolerance of a 75° C. solution of the linear alkyltoluene sulfonate. Sodium ion tolerance of a 0.5%w solution of the surfactant was measured using the salt tolerance titration method. A 24.0%w sodium chloride solution was added in 1.0 cc aliquots to 100 cc of the surfactant solution with vigorous stirring. In the absence of any addition of a alkylpolysaccharide, the addition of about 14,000 ppm of sodium ions, based on surfactant solution, reduced light transmittance to one half of its initial level. The complete results of Comparative Experiment B are presented in Table B.

TABLE B

| Added $Na^+$ concentration, ppm | Added Poly-saccharide | Added Poly-saccharide concentration, % w | Transmittance % of initial value |
|---|---|---|---|
| 0 | none | 0 | 100.0 |
| 935 | none | 0 | 90.0 |
| 2749 | none | 0 | 87.8 |
| 4495 | none | 0 | 86.2 |
| 6991 | none | 0 | 82.7 |
| 8581 | none | 0 | 80.0 |
| 10,113 | none | 0 | 76.5 |
| 12,311 | none | 0 | 72.0 |
| 13,714 | none | 0 | 60.4 |
| 14,398 | none | 0 | 38.8 |
| 15,731 | none | 0 | 8.3 |
| 16,381 | none | 0 | 4.3 |
| 17,020 | none | 0 | 2.5 |
| 17,649 | none | 0 | 1.8 |

For Example 4, the test procedures of Comparative Experiment B were repeated, although in this case the surfactant solution contained (in addition to the 0.5%w aklyltoluene sulfonate) 0.10%w of polysaccharide I. The presence of the polysaccharide meaningfully increased the sodium salt tolerance of the sulfonate surfactant solution. Light transmittance in the test remained at greater than 60% of its initial level after addition of about 25,500 ppm sodium ions (at which point the sample cell was full and no further sodium chloride addition was possible). Results of Example 4 are presented in Table 4.

TABLE 4

| Added $Na^+$ concentration, ppm | Added Poly-saccharide | Added Poly-saccharide concentration, % w | Transmittance % of initial value |
|---|---|---|---|
| 0 | I | 0.10 | 100.0 |
| 944 | I | 0.10 | 88.8 |
| 1888 | I | 0.10 | 85.9 |
| 2831 | I | 0.10 | 85.1 |
| 3775 | I | 0.10 | 84.5 |
| 4719 | I | 0.10 | 84.2 |
| 5663 | I | 0.10 | 84.1 |
| 6607 | I | 0.10 | 83.9 |
| 7551 | I | 0.10 | 83.7 |
| 8495 | I | 0.10 | 83.4 |
| 9439 | I | 0.10 | 82.7 |
| 10,382 | I | 0.10 | 82.2 |
| 11,326 | I | 0.10 | 81.6 |
| 12,270 | I | 0.10 | 81.0 |
| 13,214 | I | 0.10 | 80.2 |
| 14,158 | I | 0.10 | 67.9 |
| 18,877 | I | 0.10 | 65.4 |
| 23,596 | I | 0.10 | 63.1 |
| 25,494 | I | 0.10 | 62.8 |

For Example 5, the sodium salt tolerance test was applied to a solution containing 0.5%w of the sulfonate and 0.25%w of the same alylpolyglycoside used in Example 4. Light transmittance remained at greater than 75% of its initial level after addition of about 20,000 ppm sodium. Results of Example 5 are presented in Table 5.

TABLE 5

| Added $Na^+$ concentration, ppm | Added Poly-saccharide | Added Poly-saccharide concentration, % w | Transmittance % of initial value |
|---|---|---|---|
| 0 | I | 0.25 | 100.0 |
| 934.5 | I | 0.25 | 91.8 |
| 2,794 | I | 0.25 | 89.2 |
| 5,342.5 | I | 0.25 | 87.5 |
| 10,858.5 | I | 0.25 | 84.4 |
| 18,887 | I | 0.25 | 77.8 |
| 20,066 | I | 0.25 | 76.2 |

For Example 6, the procedures of Example 5 were again followed, although in this case 0.25%w of a polysaccharide II was incorporated in the aqueous alkyltoluene sulfonate sample. This alkylpolyglycoside was equally effective for reducing the sodium salt tolerance of the alkyltoluene sulfonate, with light transmittance remaining at almost 70% of its initial value after addition of 22,000 ppm sodium. Results of Example 6 are presented in Table 6.

TABLE 6

| Added $Na^+$ concentration, ppm | Added Poly-saccharide | Added Poly-saccharide concentration, % w | Transmittance % of initial value |
|---|---|---|---|
| 0 | II | 0.25 | 100.0 |
| 944 | II | 0.25 | 75.5 |
| 1888 | II | 0.25 | 71.8 |
| 2834 | II | 0.25 | 71.9 |
| 3775 | II | 0.25 | 72.2 |
| 4719 | II | 0.25 | 71.8 |

TABLE 6-continued

| Added Na+ concentration, ppm | Added Poly-saccharide | Added Polysaccharide concentration, % w | Transmittance % of initial value |
|---|---|---|---|
| 5663 | II | 0.25 | 71.4 |
| 6607 | II | 0.25 | 71.2 |
| 8495 | II | 0.25 | 70.7 |
| 9439 | II | 0.25 | 70.4 |
| 13,214 | II | 0.25 | 70.0 |
| 14,158 | II | 0.25 | 69.8 |
| 17,933 | II | 0.25 | 69.4 |
| 18,877 | II | 0.25 | 69.2 |
| 21,709 | II | 0.25 | 68.7 |
| 22,652 | II | 0.25 | 68.6 |

COMPARATIVE EXAMPLE C AND EXAMPLE 7

This Example and Comparative Experiment demonstrate the benefits of this invention in enhancing the calcium ion tolerance of a different alkyltoluene sulfonate surfactant solution. This alkyltoluene sulfonate surfactant was characterized by mixed $C_{11}$ and $C_{12}$ alkyl groups, essentially all of linear carbon structure. This surfactant is commercially available as ENORDET LTS 1112.

Comparative Experiment C illustrates the calcium salt tolerance of a 75° C. solution of the linear $C_{11}/C_{12}$ alkyltoluene sulfonate. Calcium ion tolerance of a 0.5%w solution of the surfactant was measured using the salt tolerance titration method. A 26.5%w calcium chloride solution was added in 25 microliter aliquots to 100 cc of the surfactant solution with vigorous stirring. In the absence of polysaccharide, the addition of about 200 ppm of calcium ions, based on surfactant solution, reduced light transmittance to one half of its initial level. The complete results of Comparative Experiment C are presented in Table C.

TABLE C

| Added $Ca^{+2}$ concentration, ppm | Added Poly-saccharide | Added Polysaccharide concentration, % w | Transmittance % of initial value |
|---|---|---|---|
| 0 | none | 0 | 100.0 |
| 24 | none | 0 | 100.8 |
| 48 | none | 0 | 100.8 |
| 72 | none | 0 | 100.7 |
| 96 | none | 0 | 100.0 |
| 119 | none | 0 | 91.4 |
| 143 | none | 0 | 82.5 |
| 167 | none | 0 | 79.2 |
| 191 | none | 0 | 66.5 |
| 215 | none | 0 | 10.2 |
| 239 | none | 0 | 9.3 |
| 263 | none | 0 | 9.5 |

For Example 7, the test procedures of Comparative Experiment C were repeated, although in this case the surfactant solution contained (in addition to the 0.5%w alkyltoluene sulfonate) 0.25%w of polysaccharide I. The presence of polysaccharide meaningfully increased the calcium salt tolerance of the sulfonate surfactant solution, with reduction in light transmittance to half the initial value observed only after addition of about 390 ppm calcium. Results of Example 7 are presented in Table 7.

TABLE 7

| Added $Ca^{+2}$ concentration, ppm | Added Poly-saccharide | Added Polysaccharide concentration, % w | Transmittance % of initial value |
|---|---|---|---|
| 0 | I | 0.25 | 100.0 |
| 24 | I | 0.25 | 99.4 |
| 48 | I | 0.25 | 98.8 |
| 72 | I | 0.25 | 98.8 |
| 96 | I | 0.25 | 98.1 |
| 119 | I | 0.25 | 96.7 |
| 143 | I | 0.25 | 94.1 |
| 167 | I | 0.25 | 90.9 |
| 191 | I | 0.25 | 88.2 |
| 215 | I | 0.25 | 85.7 |
| 239 | I | 0.25 | 84.5 |
| 263 | I | 0.25 | 83.8 |
| 287 | I | 0.25 | 83.3 |
| 311 | I | 0.25 | 82.8 |
| 335 | I | 0.25 | 82.5 |
| 359 | I | 0.25 | 79.3 |
| 383 | I | 0.25 | 62.8 |
| 407 | I | 0.25 | 12.0 |
| 415 | I | 0.25 | 0.2 |

COMPARATIVE EXPERIMENTS D-X

A series of Comparative Experiments were carried out to test the ability of polysaccharides to enhance the salt tolerance of a series of different alkyl-substituted xylene sulfonates. In each case, the introduction of a polysaccharide to the alkylxylene sulfonate sulfonate solution failed to provide the desired degree of enhancement in salt tolerance and/or failed to provide a significant and/or a consistent enhancement in tolerance of the surfactant solution for sodium and/or calcium ions. In many cases, the introduction of polysaccharides to alkylxylene sulfonates decreased the salt tolerance of the surfactant solution. In other cases, an moderate degree of increase in salt tolerance was observed for one salt, but not for the other. In still other cases, either the ultimate salt tolerance or the degree of increase in tolerance was not sufficient to justify practical application of the invention to alkylxylene sulfonate solutions.

In a Comparative Experiment D, calcium tolerance tests were run for a 0.5%w aqueous solution of an alkylxylene sulfonate, characterized as the product of the alkylation of o-xylene with essentially linear $C_{18}$ alpha-olefins. In the absence of any alkylpolysaccharide, the addition of about 125 ppm of calcium ions reduced light transmittance to one half of its initial level.

For Comparative Example E, 0.25%w of polysaccharide I was introduced into a like alkylxylene sulfonate solution. Light transmittance was reduced to one half of its initial value after addition of only about 100 ppm of calcium. Thus, the introduction of the polysaccharide to this alkylxylene sulfonate solution actually reduced its calcium salt tolerance.

Likewise, in Comparative Experiment F, a test of the introduction of 0.25%w of polysaccharide II into a 0.5%w aqueous solution of this alkylxylene sulfonate showed a 50% reduction in light transmittance upon addition of only about 95 ppm of calcium ions.

Results of Comparative Experiments D, E and F are shown in Tables D, E and F, respectively.

TABLE D

| Added Ca$^{+2}$ concentration, ppm | Added Polysaccharide | Added Polysaccharide concentration, %w | Transmittance % of initial value |
|---|---|---|---|
| 0 | none | 0 | 100.0 |
| 24 | none | 0 | 98.4 |
| 48 | none | 0 | 92.7 |
| 72 | none | 0 | 82.2 |
| 96 | none | 0 | 67.8 |
| 119 | none | 0 | 55.8 |
| 143 | none | 0 | 32.1 |
| 167 | none | 0 | 3.5 |

TABLE E

| Added Ca$^{+2}$ concentration, ppm | Added Polysaccharide | Added Polysaccharide concentration, %w | Transmittance % of initial value |
|---|---|---|---|
| 0 | I | 0.25 | 100.0 |
| 24 | I | 0.25 | 93.4 |
| 48 | I | 0.25 | 82.3 |
| 72 | I | 0.25 | 66.1 |
| 96 | I | 0.25 | 52.4 |
| 143 | I | 0.25 | 32.8 |
| 167 | I | 0.25 | 26.5 |
| 191 | I | 0.25 | 17.3 |
| 215 | I | 0.25 | 1.9 |
| 239 | I | 0.25 | 1.4 |

TABLE F

| Added Ca$^{+2}$ concentration, ppm | Added Polysaccharide | Added Polysaccharide concentration, %w | Transmittance % of initial value |
|---|---|---|---|
| 0 | II | 0.25 | 100.0 |
| 24 | II | 0.25 | 94.3 |
| 48 | II | 0.25 | 83.8 |
| 72 | II | 0.25 | 65.1 |
| 96 | II | 0.25 | 48.4 |
| 120 | II | 0.25 | 35.9 |
| 143 | II | 0.25 | 29.1 |
| 167 | II | 0.25 | 25.4 |
| 191 | II | 0.25 | 22.0 |
| 215 | II | 0.25 | 4.6 |
| 239 | II | 0.25 | 1.5 |

For Comparative Experiment G, a test was made of the sodium salt tolerance of the same C$_{18}$-alkylxylene sulfonate solution in the absence of any polysaccharide. A 50% reduction in light transmittance was observed upon addition of about 4400 ppm sodium ions.

In Comparative Experiment H, introduction of 0.25%w of polysaccharide I increased the sodium salt tolerance of the alkylxylene sulfonate solution to the point that a 50% reduction in light transmittance was observed at about 6800 ppm of sodium ions.

However, in Comparative Experiment I, 0.25% of polysaccharide II failed to provide a significant increase in the sodium tolerance of the alkylxylene solution—50% reduction in light transmittance occurred upon addition of about 4600 ppm of sodium ions.

Results of Comparative Experiments G, H and I are presented in Tables G, H and I, respectively.

TABLE G

| Added Na$^+$ concentration, ppm | Added Polysaccharide | Added Polysaccharide concentration, %w | Transmittance % of initial value |
|---|---|---|---|
| 0 | none | 0 | 100.0 |
| 934.5 | none | 0 | 89.8 |
| 1851 | none | 0 | 79.8 |
| 2749 | none | 0 | 69.6 |
| 3630 | none | 0 | 59.8 |
| 4494.5 | none | 0 | 49.3 |
| 5342.5 | none | 0 | 37.3 |
| 6175 | none | 0 | 25.5 |
| 6991 | none | 0 | 16.3 |
| 7993 | none | 0 | 9.6 |

TABLE H

| Added Na$^+$ concentration, ppm | Added Polysaccharide | Added Polysaccharide concentration, %w | Transmittance % of initial value |
|---|---|---|---|
| 0 | I | 0.25 | 100.0 |
| 934.5 | I | 0.25 | 90.3 |
| 2749 | I | 0.25 | 80.6 |
| 4494.5 | I | 0.25 | 68.0 |
| 5342.5 | I | 0.25 | 61.2 |
| 6991 | I | 0.25 | 48.2 |
| 8580 | I | 0.25 | 35.0 |
| 9353.5 | I | 0.25 | 28.4 |
| 10,858 | I | 0.25 | 15.2 |
| 11,591 | I | 0.25 | 10.2 |

TABLE I

| Added Na$^+$ concentration, ppm | Added Polysaccharide | Added Polysaccharide concentration, %w | Transmittance % of initial value |
|---|---|---|---|
| 0 | II | 0.25 | 100.0 |
| 934 | II | 0.25 | 76.1 |
| 1888 | II | 0.25 | 71.8 |
| 2832 | II | 0.25 | 65.2 |
| 3775 | II | 0.25 | 56.9 |
| 4719 | II | 0.25 | 49.2 |
| 5663 | II | 0.25 | 42.0 |
| 6607 | II | 0.25 | 34.9 |
| 7551 | II | 0.25 | 27.8 |
| 8495 | II | 0.25 | 20.6 |
| 9438 | II | 0.25 | 14.6 |
| 10,382 | II | 0.25 | 9.7 |
| 11,326 | II | 0.25 | 6.2 |
| 12,270 | II | 0.25 | 3.8 |

Comparative Experiments J, K and L tested the calcium salt tolerance of a 0.5%w aqueous solution of an alkylxylene sulfonate solution, wherein the surfactant had been derived via alkylation of o-xylene with essentially linear alpha-olefins of mixed C$_{11}$ and C$_{12}$ carbon number. Introduction of 0.25%w of either of the polysaccharide I or II resulted in a decrease of the calcium tolerance of the solution.

Results of Comparative Experiments J, K and L are presented in Tables J, K and L, respectively.

TABLE J

| Added Ca$^{+2}$ concentration, ppm | Added Polysaccharide | Added Polysaccharide concentration, %w | Transmittance % of initial value |
|---|---|---|---|
| 0 | none | 0 | 100.0 |
| 24 | none | 0 | 100.0 |
| 48 | none | 0 | 98.8 |
| 72 | none | 0 | 84.0 |
| 96 | none | 0 | 70.6 |
| 119 | none | 0 | 57.1 |
| 143 | none | 0 | 46.7 |
| 167 | none | 0 | 51.1 |

TABLE J-continued

| Added Ca$^{+2}$ concentration, ppm | Added Poly-saccharide | Added Poly-saccharide concentration, % w | Transmittance % of initial value |
|---|---|---|---|
| 191 | none | 0 | 1.5 |

TABLE K

| Added Ca$^{+2}$ concentration, ppm | Added Poly-saccharide | Added Poly-saccharide concentration, % w | Transmittance % of initial value |
|---|---|---|---|
| 0 | I | 0.25 | 100.0 |
| 24 | I | 0.25 | 100.3 |
| 48 | I | 0.25 | 94.5 |
| 72 | I | 0.25 | 70.9 |
| 96 | I | 0.25 | 51.4 |
| 119 | I | 0.25 | 39.2 |
| 143 | I | 0.25 | 30.0 |
| 167 | I | 0.25 | 23.7 |
| 191 | I | 0.25 | 30.5 |
| 215 | I | 0.25 | 17.0 |
| 239 | I | 0.25 | 4.6 |
| 263 | I | 0.25 | 1.6 |

TABLE L

| Added Ca$^{+2}$ concentration, ppm | Added Poly-saccharide | Added Poly-saccharide concentration, % w | Transmittance % of initial value |
|---|---|---|---|
| 0 | II | 0.25 | 100.0 |
| 24 | II | 0.25 | 100.0 |
| 48 | II | 0.25 | 94.1 |
| 72 | II | 0.25 | 75.4 |
| 96 | II | 0.25 | 59.8 |
| 119 | II | 0.25 | 48.2 |
| 143 | II | 0.25 | 41.2 |
| 167 | II | 0.25 | 34.0 |
| 191 | II | 0.25 | 32.6 |
| 215 | II | 0.25 | 30.0 |
| 239 | II | 0.25 | 8.9 |
| 263 | II | 0.25 | 2.3 |

Comparative Experiments M, N and O tested the sodium salt tolerance of 0.5%w solutions of the same $C_{11}/C_{12}$ alkyl o-xylene sulfonates. Introduction of 0.25%w of polysaccharide II did not meaningfully change the sodium tolerance of the sulfonate solution. Introduction of 0.25%w of polysaccharide I increased the point of 50% reduction in light transmittance from about 4500 ppm sodium ions to about 6200 ppm sodium ions.

Results of Comparative Experiments M, N and O are presented in Tables M, N and O, respectively.

TABLE M

| Added Na$^+$ concentration, ppm | Added Poly-saccharide | Added Poly-saccharide concentration, % w | Transmittance % of initial value |
|---|---|---|---|
| 0 | none | 0 | 100.0 |
| 954 | none | 0 | 99.2 |
| 1851 | none | 0 | 99.2 |
| 2749 | none | 0 | 78.8 |
| 3630 | none | 0 | 59.4 |
| 4495 | none | 0 | 50.4 |
| 5343 | none | 0 | 40.9 |
| 6175 | none | 0 | 37.0 |
| 6991 | none | 0 | 35.7 |
| 7793 | none | 0 | 36.1 |
| 8580 | none | 0 | 34.2 |
| 9353 | none | 0 | 31.2 |

TABLE M-continued

| Added Na$^+$ concentration, ppm | Added Poly-saccharide | Added Poly-saccharide concentration, % w | Transmittance % of initial value |
|---|---|---|---|
| 10,113 | none | 0 | 31.5 |

TABLE N

| Added Na$^+$ concentration, ppm | Added Poly-saccharide | Added Poly-saccharide concentration, % w | Transmittance % of initial value |
|---|---|---|---|
| 0 | II | 0.25 | 100.0 |
| 954 | II | 0.25 | 99.9 |
| 1851 | II | 0.25 | 94.2 |
| 2749 | II | 0.25 | 78.3 |
| 3630 | II | 0.25 | 67.4 |
| 4495 | II | 0.25 | 61.6 |
| 5343 | II | 0.25 | 57.1 |
| 6175 | II | 0.25 | 54.0 |
| 6991 | II | 0.25 | 33.1 |
| 7793 | II | 0.25 | 29.1 |
| 8580 | II | 0.25 | 21.4 |
| 9353 | II | 0.25 | 19.9 |
| 10,113 | II | 0.25 | 19.7 |
| 15,371 | II | 0.25 | 14.0 |

TABLE O

| Added Na$^+$ concentration, ppm | Poly-saccharide | Added Poly-saccharide concentration, % w | Transmittance % of initial value |
|---|---|---|---|
| 0 | I | 0.25 | 100.0 |
| 954 | I | 0.25 | 100.6 |
| 1851 | I | 0.25 | 93.3 |
| 2749 | I | 0.25 | 72.9 |
| 3630 | I | 0.25 | 60.0 |
| 4495 | I | 0.25 | 53.8 |
| 5343 | I | 0.25 | 46.5 |
| 6175 | I | 0.25 | 29.3 |
| 6991 | I | 0.25 | 25.0 |
| 7793 | I | 0.25 | 23.3 |
| 8580 | I | 0.25 | 23.0 |
| 9353 | I | 0.25 | 23.1 |
| 10,113 | I | 0.25 | 23.5 |
| 13,714 | I | 0.25 | 16.9 |

In Comparative Experiments P and Q, tests were made of the influence of polysaccharide I on the calcium ion tolerance of a 0.5%w solution of a $C_{11}/C_{12}$-alkyl p-xylene sulfonate. Introduction of the polysaccharide increased the calcium ion tolerance. However, a reduction of 50% in light transmittance was still reached at a low concentration (about 100 ppm) of calcium ions.

Results of Comparative Experiments P and Q are presented in Tables P and Q.

TABLE P

| Added Ca$^{+2}$ concentration, ppm | Added Poly-saccharide | Added Poly-saccharide concentration, % w | Transmittance % of initial value |
|---|---|---|---|
| 0 | none | 0 | 100.0 |
| 24 | none | 0 | 100.1 |
| 48 | none | 0 | 100.2 |
| 72 | none | 0 | 32.2 |
| 96 | none | 0 | 9.6 |
| 119 | none | 0 | 9.1 |

TABLE Q

| Added $Ca^{+2}$ concentration, ppm | Added Polysaccharide | Added Polysaccharide concentration, % w | Transmittance % of initial value |
|---|---|---|---|
| 0 | I | 0.25 | 100.0 |
| 24 | I | 0.25 | 99.8 |
| 48 | I | 0.25 | 99.8 |
| 72 | I | 0.25 | 99.9 |
| 96 | I | 0.25 | 96.9 |
| 119 | I | 0.25 | 21.5 |
| 143 | I | 0.25 | 13.5 |
| 167 | I | 0.25 | 10.8 |
| 191 | I | 0.25 | 9.9 |
| 215 | I | 0.25 | 9.3 |
| 239 | I | 0.25 | 9.4 |
| 263 | I | 0.25 | 9.3 |
| 287 | I | 0.25 | 9.2 |
| 311 | I | 0.25 | |

The influence of alkylpolyglycosides upon the salt tolerance of alkylxylene sulfonates (derived via alkylation of o-xylene with a mixture of substantially linear alpha-olefins having carbon numbers of 8, 10, 12, and 14) was tested in Comparative Experiments R, S, T, U, V, W and X. In Comparative Experiments R-U, the calcium salt tolerance of 0.5%w solutions of the $C_{8-14}$-alkyl o-xylene sulfonates was tested and compared with salt tolerance after introduction of either 0.10%w or 0.25%w of polysaccharide I (in Experiments S and T) or 0.25%w of polysaccharide II (in Experiment U). Introduction of polysaccharide I at 0.10%w significantly reduced calcium ion tolerance of the sulfonate surfactant (reduction of 50% in light transmittance at about 115 ppm calcium, compared to about 150 ppm calcium in the absence of the polysaccharide). Introduction of 0.25%w of this same polysaccharide resulted in a slight decrease in salt tolerance (from about 150 ppm to about 140 ppm, for 50% light transmittance). Introduction of the polysaccharide II slightly increased calcium tolerance, from about 150 ppm to about 170 ppm (for 50% light transmittance). In Comparative Experiments V, W and X, the sodium tolerance of the 0.5%w aqueous $C_{8-14}$-alkyl o-xylene sulfonate was tested, with and without polysaccharide introduction. Upon introducing 0.25%w of polysaccharide I, sodium ion tolerance (the measured point of 50% light transmittance) decreased slightly, from about 5000 ppm to about 4400 ppm. Introduction of 0.25%w of polysaccharide II to the 0.5%w sulfonate solution increased sodium tolerance, from about 5000 ppm to about 6600 ppm, at 50% transmittance.

Results of Comparative Experiments R-X are presented in Tables R-X.

TABLE R

| Added $Ca^{+2}$ concentration, ppm | Added Polysaccharide | Added Polysaccharide concentration, % w | Transmittance % of initial value |
|---|---|---|---|
| 0 | none | 0 | 100.0 |
| 24 | none | 0 | 100.1 |
| 48 | none | 0 | 98.8 |
| 72 | none | 0 | 81.5 |
| 96 | none | 0 | 69.6 |
| 119 | none | 0 | 60.8 |
| 143 | none | 0 | 63.8 |
| 167 | none | 0 | 20.2 |
| 191 | none | 0 | 0.7 |

TABLE S

| Added $Ca^{+2}$ concentration, ppm | Added Polysaccharide | Added Polysaccharide concentration, % w | Transmittance % of initial value |
|---|---|---|---|
| 0 | I | 0.25 | 100.0 |
| 24 | I | 0.25 | 99.9 |
| 48 | I | 0.25 | 94.4 |
| 72 | I | 0.25 | 82.9 |
| 96 | I | 0.25 | 69.1 |
| 120 | I | 0.25 | 58.3 |
| 144 | I | 0.25 | 48.5 |
| 167 | I | 0.25 | 43.1 |
| 191 | I | 0.25 | 41.4 |
| 215 | I | 0.25 | 21.8 |
| 239 | I | 0.25 | 10.9 |
| 263 | I | 0.25 | 3.8 |

TABLE T

| Added $Ca^{+2}$ concentration, ppm | Added Polysaccharide | Added Polysaccharide concentration, % w | Transmittance % of initial value |
|---|---|---|---|
| 0 | I | 0.10 | 100.0 |
| 24 | I | 0.10 | 100.1 |
| 48 | I | 0.10 | 91.3 |
| 72 | I | 0.10 | 73.2 |
| 96 | I | 0.10 | 59.5 |
| 120 | I | 0.10 | 47.3 |
| 144 | I | 0.10 | 40.6 |
| 167 | I | 0.10 | 46.6 |
| 191 | I | 0.10 | 20.4 |
| 215 | I | 0.10 | 1.0 |

TABLE U

| Added $Ca^{+2}$ concentration, ppm | Added Polysaccharide | Added Polysaccharide concentration, % w | Transmittance % of initial value |
|---|---|---|---|
| 0 | II | 0.25 | 100.0 |
| 24 | II | 0.25 | 99.9 |
| 48 | II | 0.25 | 92.8 |
| 72 | II | 0.25 | 80.9 |
| 96 | II | 0.25 | 71.2 |
| 120 | II | 0.25 | 62.8 |
| 144 | II | 0.25 | 56.7 |
| 167 | II | 0.25 | 50.5 |
| 191 | II | 0.25 | 47.1 |
| 215 | II | 0.25 | 37.2 |
| 239 | II | 0.25 | 14.5 |
| 263 | II | 0.25 | 9.4 |
| 287 | II | 0.25 | 4.5 |

TABLE V

| Added $Na^+$ concentration, ppm | Added Polysaccharide | Added Polysaccharide concentration, % w | Transmittance % of initial value |
|---|---|---|---|
| 0 | none | 0 | 100.0 |
| 934 | none | 0 | 100.0 |
| 1851 | none | 0 | 99.4 |
| 2749 | none | 0 | 89.3 |
| 3630 | none | 0 | 66.5 |
| 4495 | none | 0 | 52.2 |
| 5343 | none | 0 | 48.2 |
| 6175 | none | 0 | 46.2 |
| 6991 | none | 0 | 40.8 |
| 7793 | none | 0 | 42.1 |
| 8580 | none | 0 | 37.8 |
| 9353 | none | 0 | 39.9 |
| 10,113 | none | 0 | 39.5 |
| 10,858 | none | 0 | 37.3 |
| 11,591 | none | 0 | 32.7 |
| 12,311 | none | 0 | 32.6 |

TABLE W

| Added Na+ concentration, ppm | Added Polysaccharide | Added Polysaccharide concentration, % w | Transmittance % of initial value |
|---|---|---|---|
| 0 | I | 0.25 | 100.0 |
| 934 | I | 0.25 | 96.7 |
| 1851 | I | 0.25 | 79.5 |
| 2749 | I | 0.25 | 63.7 |
| 3630 | I | 0.25 | 53.9 |
| 4495 | I | 0.25 | 49.4 |
| 5343 | I | 0.25 | 46.5 |
| 6175 | I | 0.25 | 44.5 |
| 6991 | I | 0.25 | 38.2 |
| 7793 | I | 0.25 | 31.0 |
| 8500 | I | 0.25 | 29.0 |
| 9353 | I | 0.25 | 28.6 |
| 10,113 | I | 0.25 | 27.3 |
| 10,858 | I | 0.25 | 28.2 |
| 11,591 | I | 0.25 | 29.0 |
| 12,311 | I | 0.25 | 29.7 |
| 13,714 | I | 0.25 | 28.0 |
| 15,070 | I | 0.25 | 27.2 |
| 15,731 | I | 0.25 | 25.9 |
| 16,381 | I | 0.25 | 23.0 |
| 17,020 | I | 0.25 | 23.2 |

TABLE X

| Added Na+ concentration, ppm | Added Polysaccharide | Added Polysaccharide concentration, % w | Transmittance % of initial value |
|---|---|---|---|
| 0 | II | 0.25 | 100.0 |
| 934 | II | 0.25 | 100.3 |
| 1851 | II | 0.25 | 96.8 |
| 2749 | II | 0.25 | 83.2 |
| 3630 | II | 0.25 | 69.1 |
| 4495 | II | 0.25 | 60.1 |
| 5343 | II | 0.25 | 54.8 |
| 6175 | II | 0.25 | 52.4 |
| 6991 | II | 0.25 | 48.0 |
| 7793 | II | 0.25 | 41.3 |
| 8500 | II | 0.25 | 30.0 |
| 9353 | II | 0.25 | 25.9 |
| 10,113 | II | 0.25 | 24.9 |
| 10,858 | II | 0.25 | 25.0 |

COMPARATIVE EXPERIMENTS Y, Z, AND AA-HH

These Comparative Experiments illustrate the influence on calcium salt tolerance of the addition of polysaccharides to solutions of alpha-olefin sulfonate surfactants, which are also commonly applied in saline aqueous solutions for enhanced oil recovery purposes.

The particular alpha-olefin sulfonate used in tests Y, Z, AA and BB was the ENORDET AOS 1618 product (trademark of and sold by Shell Chemical Company) derived via the sulfonation of a mixture of $C_{16}$ and $C_{18}$ essentially linear alpha-olefins. For tests CC-EE, the sulfonate was the ENORDET IOS 1517 product derived via the sulfonation of a mixture of $C_{15}-C_{17}$ essentially linear (about 9% branched) internal olefins of mixed double bond position. For tests FF-HH, the sulfonate was the ENORDET IOS 2024 product derived via sulfonation of a mixture of $C_{20}$ to $C_{24}$ internal olefins (about 33% branched).

Calcium salt tolerance of a 0.5%w solution of the surfactant was measured at 75° C. using the salt tolerance titration method. For Comparative Experiments Y, CC and FF, a 26.5%w calcium chloride solution was added in 25 microliter aliquots to 100 cc of the surfactant solution with vigorous stirring.

For Comparative Experiment Y, in the absence of any polysaccharide, the addition of more than about 300 ppm of calcium ions, based on surfactant solution, greatly reduced its light transmittance. Formation of a precipitate was observed to accompany the loss in transmittance. In Comparative Example Z, the test procedures of Comparative Experiment Y were repeated, although in this case the surfactant solution contained (in addition to the 0.5%w alpha-olefin sulfonate) 0.10%w of polysaccharide I. The presence of the polysaccharide substantially increased the calcium salt tolerance of the alpha-olefin sulfonate solution—light transmittance was meaningfully reduced only after addition of approximately 500 ppm of calcium ions. For Comparative Experiment AA, the salt tolerance test was applied to a solution containing 0.5%w alpha-olefin sulfonate and 0.25%w of the same polysaccharide. Reduction of light transmittance was observed only after addition of greater than about 1000 ppm of calcium ions. In Comparative Example BB, addition of polysaccharide II, in a concentration of 0.25%w, failed to enhance the salt tolerance of the alpha-olefin sulfonate. Reduction (50% light transmittance) in calcium salt tolerance was encountered at a calcium ion concentration near 130 ppm.

For Comparative Experiment CC, in the absence of any polysaccharide, addition of about 240 ppm of calcium ions reduced light transmittance to about one half of its initial value. In the presence of 0.25%w of polysaccharide I in Experiment DD and in the presence of 0.25%w of polysaccharide II in Experiment EE, light transmittance was reduced by one half only after addition of about 450 ppm calcium ions and about 640 ppm calcium ions, respectively.

For Comparative Experiment FF, in the absence of any polysaccharide, less than 100 ppm of calcium ions greatly reduced light transmittance. The presence of 0.25%w of polysaccharide I in Experiment GG and the presence of 0.25%w of polysaccharide II in Experiment HH greatly increased salt tolerance of the sulfonate.

Results of Comparative Experiments Y, Z, and AA-HH are presented in the following corresponding Tables. These results show that the polysaccharide does not uniformly increase the calcium ion tolerance of olefin sulfonate solutions. Other experiments have shown that polysaccharides have little influence over the sodium ion tolerance of olefin sulfonate surfactant.

TABLE Y

| Added $Ca^{+2}$ concentration, ppm | Added Polysaccharide | Added Polysaccharide concentration, % w | Transmittance % of initial value |
|---|---|---|---|
| 0 | none | 0 | 100.0 |
| 96 | none | 0 | 102.5 |
| 191 | none | 0 | 101.8 |
| 287 | none | 0 | 94.3 |
| 382 | none | 0 | 1.4 |
| 478 | none | 0 | 0.8 |

TABLE Z

| Added $Ca^{+2}$ concentration, ppm | Added Polysaccharide | Added Polysaccharide concentration, % w | Transmittance % of initial value |
|---|---|---|---|
| 0 | I | 0.10 | 100.0 |
| 96 | I | 0.10 | 100.3 |
| 191 | I | 0.10 | 100.1 |
| 287 | I | 0.10 | 99.8 |

TABLE Z-continued

| Added Ca$^{+2}$ concentration, ppm | Added Poly-saccharide | Added Poly-saccharide concentration, % w | Transmittance % of initial value |
|---|---|---|---|
| 382 | I | 0.10 | 98.4 |
| 478 | I | 0.10 | 94.8 |
| 574 | I | 0.10 | 27.1 |
| 669 | I | 0.10 | 5.4 |
| 764 | I | 0.10 | 2.7 |
| 860 | I | 0.10 | 2.5 |
| 956 | I | 0.10 | 2.3 |

TABLE AA

| Added Ca$^{+2}$ concentration, ppm | Added Poly-saccharide | Added Poly-saccharide concentration, % w | Transmittance % of initial value |
|---|---|---|---|
| 0 | I | 0.25 | 100.0 |
| 96 | I | 0.25 | 100.1 |
| 191 | I | 0.25 | 99.9 |
| 287 | I | 0.25 | 99.3 |
| 382 | I | 0.25 | 98.6 |
| 478 | I | 0.25 | 98.0 |
| 669 | I | 0.25 | 96.5 |
| 860 | I | 0.25 | 93.7 |
| 1052 | I | 0.25 | 84.2 |
| 1147 | I | 0.25 | 42.8 |
| 1243 | I | 0.25 | 15.9 |
| 1338 | I | 0.25 | 12.5 |
| 1434 | I | 0.25 | 10.1 |
| 1530 | I | 0.25 | 8.7 |

TABLE BB

| Added Ca$^{+2}$ concentration, ppm | Added Poly-saccharide | Added Poly-saccharide concentration, % w | Transmittance % of initial value |
|---|---|---|---|
| 0 | II | 0.25 | 100.0 |
| 24 | II | 0.25 | 100.1 |
| 48 | II | 0.25 | 100.1 |
| 72 | II | 0.25 | 99.3 |
| 96 | II | 0.25 | 97.4 |
| 120 | II | 0.25 | 83.0 |
| 144 | II | 0.25 | 12.6 |
| 167 | II | 0.25 | 4.0 |
| 191 | II | 0.25 | 3.1 |
| 215 | II | 0.25 | 2.3 |
| 239 | II | 0.25 | 1.8 |

TABLE CC

| Added Ca$^{+2}$ concentration, ppm | Added Poly-saccharide | Added Poly-saccharide concentration, % w | Transmittance % of initial value |
|---|---|---|---|
| 0 | none | 0 | 100.0 |
| 48 | none | 0 | 99.6 |
| 96 | none | 0 | 99.4 |
| 143 | none | 0 | 99.2 |
| 167 | none | 0 | 98.0 |
| 191 | none | 0 | 93.0 |
| 215 | none | 0 | 80.8 |
| 239 | none | 0 | 50.6 |
| 263 | none | 0 | 20.8 |
| 286 | none | 0 | 10.4 |
| 310 | none | 0 | 8.7 |
| 334 | none | 0 | 8.4 |

TABLE DD

| Added Ca$^{+2}$ concentration, ppm | Added Poly-saccharide | Added Poly-saccharide concentration, % w | Transmittance % of initial value |
|---|---|---|---|
| 0 | I | 0.25 | 100.0 |
| 48 | I | 0.25 | 100.0 |
| 96 | I | 0.25 | 99.9 |
| 191 | I | 0.25 | 98.2 |
| 215 | I | 0.25 | 96.2 |
| 239 | I | 0.25 | 92.8 |
| 263 | I | 0.25 | 89.0 |
| 286 | I | 0.25 | 84.3 |
| 310 | I | 0.25 | 79.4 |
| 334 | I | 0.25 | 74.2 |
| 358 | I | 0.25 | 69.0 |
| 381 | I | 0.25 | 64.3 |
| 405 | I | 0.25 | 59.0 |
| 429 | I | 0.25 | 55.7 |
| 452 | I | 0.25 | 50.4 |
| 476 | I | 0.25 | 12.4 |
| 500 | I | 0.25 | 8.4 |
| 523 | I | 0.25 | 8.4 |

TABLE EE

| Added Ca$^{+2}$ concentration, ppm | Added Poly-saccharide | Added Poly-saccharide concentration, % w | Transmittance % of initial value |
|---|---|---|---|
| 0 | II | 0.25 | 100.0 |
| 48 | II | 0.25 | 99.8 |
| 96 | II | 0.25 | 99.6 |
| 143 | II | 0.25 | 99.1 |
| 167 | II | 0.25 | 98.4 |
| 191 | II | 0.25 | 97.6 |
| 215 | II | 0.25 | 96.0 |
| 239 | II | 0.25 | 93.9 |
| 263 | II | 0.25 | 91.6 |
| 286 | II | 0.25 | 88.7 |
| 310 | II | 0.25 | 85.8 |
| 334 | II | 0.25 | 82.3 |
| 358 | II | 0.25 | 79.1 |
| 381 | II | 0.25 | 75.7 |
| 405 | II | 0.25 | 72.4 |
| 429 | II | 0.25 | 69.1 |
| 452 | II | 0.25 | 66.1 |
| 476 | II | 0.25 | 63.3 |
| 500 | II | 0.25 | 60.7 |
| 523 | II | 0.25 | 58.3 |
| 547 | II | 0.25 | 56.3 |
| 571 | II | 0.25 | 54.6 |
| 594 | II | 0.25 | 52.9 |
| 618 | II | 0.25 | 51.3 |
| 642 | II | 0.25 | 50.0 |
| 665 | II | 0.25 | 48.6 |
| 689 | II | 0.25 | 46.9 |
| 712 | II | 0.25 | 44.9 |
| 734 | II | 0.25 | 41.1 |
| 760 | II | 0.25 | 27.3 |
| 783 | II | 0.25 | 11.6 |
| 807 | II | 0.25 | 8.7 |
| 830 | II | 0.25 | 8.4 |
| 854 | II | 0.25 | 8.4 |

TABLE FF

| Added Ca$^{+2}$ concentration, ppm | Added Poly-saccharide | Added Poly-saccharide concentration, % w | Transmittance % of initial value |
|---|---|---|---|
| 0 | none | 0 | 100.0 |
| 48 | none | 0 | 68.2 |
| 96 | none | 0 | 7.3 |
| 143 | none | 0 | 1.4 |

TABLE GG

| Added Ca$^{+2}$ concentration, ppm | Added Polysaccharide | Added Polysaccharide concentration, % w | Transmittance % of initial value |
|---|---|---|---|
| 0 | I | 0.25 | 100.0 |
| 24 | I | 0.25 | 100.0 |
| 48 | I | 0.25 | 99.4 |
| 96 | I | 0.25 | 98.9 |
| 143 | I | 0.25 | 97.0 |
| 167 | I | 0.25 | 92.1 |
| 191 | I | 0.25 | 80.8 |
| 215 | I | 0.25 | 69.3 |
| 239 | I | 0.25 | 58.2 |
| 263 | I | 0.25 | 48.5 |
| 286 | I | 0.25 | 40.8 |
| 310 | I | 0.25 | 34.5 |
| 334 | I | 0.25 | 28.2 |
| 358 | I | 0.25 | 21.5 |
| 381 | I | 0.25 | 14.8 |
| 405 | I | 0.25 | 9.7 |
| 429 | I | 0.25 | 9.5 |

TABLE HH

| Added Ca$^{+2}$ concentration, ppm | Added Polysaccharide | Added Polysaccharide concentration, % w | Transmittance % of initial value |
|---|---|---|---|
| 0 | II | 0.25 | 100.0 |
| 48 | II | 0.25 | 99.8 |
| 96 | II | 0.25 | 98.9 |
| 119 | II | 0.25 | 96.9 |
| 143 | II | 0.25 | 92.0 |
| 167 | II | 0.25 | 82.2 |
| 191 | II | 0.25 | 70.3 |
| 215 | II | 0.25 | 59.1 |
| 239 | II | 0.25 | 49.5 |
| 263 | II | 0.25 | 41.8 |
| 286 | II | 0.25 | 35.0 |
| 310 | II | 0.25 | 29.6 |
| 334 | II | 0.25 | 23.7 |
| 358 | II | 0.25 | 17.1 |
| 381 | II | 0.25 | 11.0 |
| 405 | II | 0.25 | 9.5 |

I claim as my invention:

1. In a process for the surfactant-aided recovery of oil from a subterranean oil-bearing formation wherein an aqueous solution comprising one or more salts selected from the group comprising calcium salts and sodium salts and one or more alkyltoluene sulfonate surfactants is applied to promote the displacement of oil from the formation, the improvement which comprises incorporating into the aqueous solution a quantity of one or more polysaccharide surfactants which is effective for enhancing the solubility therein of the alkyltoluene sulfonate surfactants, said polysaccharide surfactants having the formula $RO(R^1O)_xS_z$, wherein R represents an alkyl, alkylphenyl, hydroxyalkyl phenyl or hydroxyalkyl moiety having a carbon number in the range from about 8 to 20, the $R^1O$ group is an oxyethylene group, x is between 0 and about 8, inclusive, S represents a glucose, galactose, glucosyl or galactosyl residue, and z is between about 0.7 and 10.0, inclusive.

2. The process of claim 1, wherein the alkyltoluene sulfonate surfactants have predominantly linear alkyl groups with carbon numbers in the range from 6 to 28.

3. The process of claim 2, wherein the alkyltoluene sulfonate surfactants have $C_{10}$ to $C_{24}$ alkyl groups at least about 75% of which are of linear carbon chain structure.

4. The process of claim 3, wherein the alkyltoluene sulfonate surfactants have $C_{18}$ to $C_{24}$ alkyl groups at least about 90% of which are of linear carbon chain structure.

5. The process of claim 3, wherein the polysaccharides are introduced in an amount which is in the range from about 0.05 to 5 percent by weight, calculated on the weight of the total solution, and which is sufficient to provide a weight ratio of alkyltoluene sulfonates to polysaccharides which is in the range from about 2:1 to 10:1.

6. The process of claim 1, wherein the polysaccharide surfactants are compounds of the formula $ROS_z$, wherein $S_z$ represents a glucose residue and z is between about 1.2 and 4.0.

7. The process of claim 6, wherein the alkyltoluene sulfonate surfactants have predominantly linear alkyl groups with carbon numbers in the range from 6 to 28.

8. The process of claim 7, wherein the alkyltoluene sulfonate surfactants are compounds having $C_{10}$ to $C_{24}$ alkyl groups at least about 75% of which are of linear carbon chain structure.

9. The process of claim 8, wherein the alkyltoluene sulfonate surfactants are compounds having $C_{18}$ to $C_{24}$ alkyl groups at least about 90% of which are of linear carbon chain structure.

10. The process of claim 8, wherein the polysaccharides are introduced in an amount which is in the range from about 0.05 to 5 percent by weight, calculated on the weight of the total solution, and which is sufficient to provide a weight ratio of alkyltoluene sulfonates to polysaccharides, which is in the range from about 2:1 to 10:1.

11. The process of claim 6, wherein the polysaccharides are introduced in an amount which is in the range from about 0.05 to 5 percent by weight, calculated on the weight of the total solution, and which is sufficient to provide a weight ratio of alkyltoluene sulfonated to polysaccharides which is in the range from about 2:1 to 10:1.

12. The process of claim 1, wherein the polysaccharide surfactants are introduced in an amount up to the weight of the alkyltoluene sulfonate surfactants.

13. The process of claim 12, wherein the polysaccharide surfactants are introduced in an amount which is in the range from about 0.05 to 5 percent by weight, calculated on the weight of the total solution, and which is sufficient to provide a weight ratio of alkyltoluene sulfonates to polysaccharides which is in the range from about 2:1 to 10:1.

14. An improved process for the surfactant-aided recovery of oil from a subterranean oil-bearing formation which comprises a step for applying a saline solution comprising one or more alkyltoluene sulfonate compounds having $C_{10}$ to $C_{24}$ alkyl groups to promote the displacement of oil from the formation, wherein the improvement comprises incorporating into the aqueous alkyltoluene sulfonate surfactant solution one or more alkylpolyglycoside surfactants of the formula $ROS_z$, wherein R represents an alkyl group having a carbon number in the range from about 8 to 20 and z is in the range from about 1.2 to 4.0, in an amount which is in the range from about 0.5 to 5 percent by weight, calculated on the weight of the total solution, and which is sufficient to provide a weight ratio of alkyltoluene sulfonate surfactants to alkylpolyglycoside surfactants which is in the range from about 2:1 to 10:1.

15. The process of claim 14, wherein the alkylpolyglycosides are incorporated into the aqueous solution in an amount which is in the range from about 0.1 to 0.5 percent by weight, calculated on the weight of the total solution.

* * * * *